Oct. 17, 1939.   W. L. CHURCH ET AL   2,176,730

DRILL STEM VALVE

Filed Sept. 7, 1937

Inventor
WALTER L. CHURCH
WILLIAM K. HOLLERAN

By E. V. Hardway
Attorney

Patented Oct. 17, 1939

2,176,730

UNITED STATES PATENT OFFICE 2,176,730

DRILL STEM VALVE

Walter L. Church, Houston, and William K. Holleron, Alta Loma, Tex.

Application September 7, 1937, Serial No. 162,672

3 Claims. (Cl. 251—93)

This invention relates to a valve and has more particular relation to a drill stem valve.

The valve is particularly adapted for connection to the upper end of the grief joint of a drill stem immediately beneath the swivel and is provided for the purpose of closing the drill stem to protect the hose and the pump valves in case a blowout is encountered during operations of drilling a well.

As is well known a drill stem is employed in drilling wells by the rotary process for the purpose of driving the drill on the lower end of the stem. During drilling operations drilling fluid is driven by a slush pump through the drilling hose and through the swivel at the top of the drill stem and on down through the stem to the drill and is returned back up on the outside of the stem and returned to the pit.

At times gas under high pressure is encountered and unless the drill stem is closed the hose and the pump are subjected to this pressure causing injury to the pump valves and the hose, sometimes causing the latter to burst.

It is an object of the present invention to provide a valve which may be readily closed, in case such pressure is encountered, so as to protect the hose and the pump.

It is another object of the invention to provide a valve of the character described which will completely close the passageway through the drill stem to prevent leakage therethrough.

With the above and other objects in view the invention has particular relation to certain novel features of construction, operation and arrangement of parts, an example of which is given in this specification and illustrated in the accompanying drawing, wherein.

Figures 1, 2:
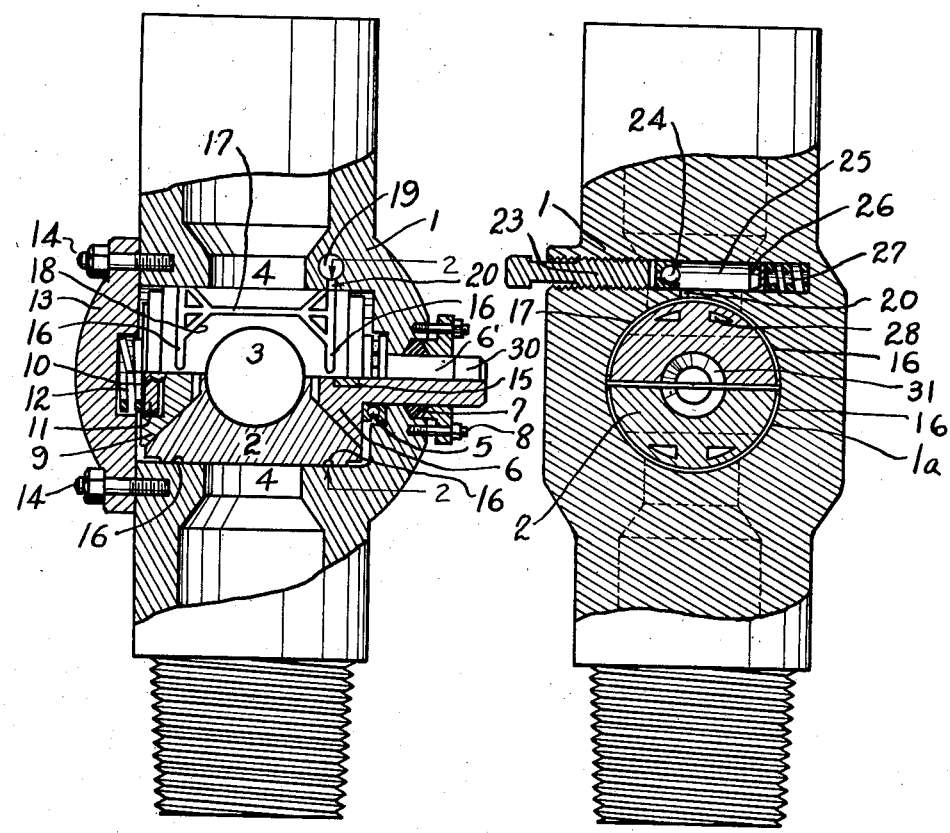
Figure 1 shows a vertical, sectional view of the valve.
Figure 2 shows a vertical, sectional view taken on the line 2—2 of Figure 1.

Referring now more particularly to the drawing wherein like numerals of reference designate the same parts in each of the figures, the numeral 1 designates the valve casing as a whole, said casing being in the form of a tubular coupling member and having a transverse cylindrical bore 1a. Within the casing there is a cylindrical shaped valve member formed of semi-cylindrical sections 2, 2 which are fitted closely together as indicated more accurately in Figures 2 and 3. The valve has a transverse passageway 3 therethrough arranged to be brought into and out of alignment with the passageways 4, 4 which extend axially through the casing 1.

At one end of the bore there is an annular anti-friction bearing assembly 5 which is countersunk into the end wall of the bore 1a. A frusto-conical shaped expander 6 is fitted into a correspondingly shaped recess 31 in the adjacent end of the valve member 2 and this expander has an outwardly extended stem 6' which is fitted through the bearing assembly 5 and which is surrounded by a stuffing box 7. This stuffing box includes the conventional gland which is bolted in place by the bolts 8. The outer end of the stem 6' has the polygonal portion 30 whereby the stem and the expander 6 may be turned and this expander has an external key 15 which fits into a keyway 15' in the valve when the parts are assembled, whereby upon rotation of the stem 6' the valve will be also turned.

At the opposite end of the valve there is a frusto-conical shaped expander 9 which fits into a correspondingly shaped recess 29 in the adjacent end of the valve. This expander 9 has a socket 9' in its outer end to receive the anti-friction bearing 10 and the retainer plate 11. The inner side of this retainer plate has the recess 11' which conforms to the shape of the bearing 10 and maintains said bearing in place as indicated in Figure 1. The valve casing 1 has a removable end cap bolted thereto by the bolts 14 and a coil spring 12 is located in a socket in the inner side of the end cap 13 and bears against the retainer plates 11. The spring 12 is of sufficient strength to cause the expanders 6, 9 to expand the valve sections 2, 2 and to cause said valve to fit closely against the walls of the bore 1a.

The valve sections shown in Figure 1 have the external circumferentially disposed grooves 16, 16 which are connected by the longitudinal, external connecting grooves as 17 and the grooves 16, 17 are connected by the diagonal grooves 18, as shown in Figure 1.

Figure 3:
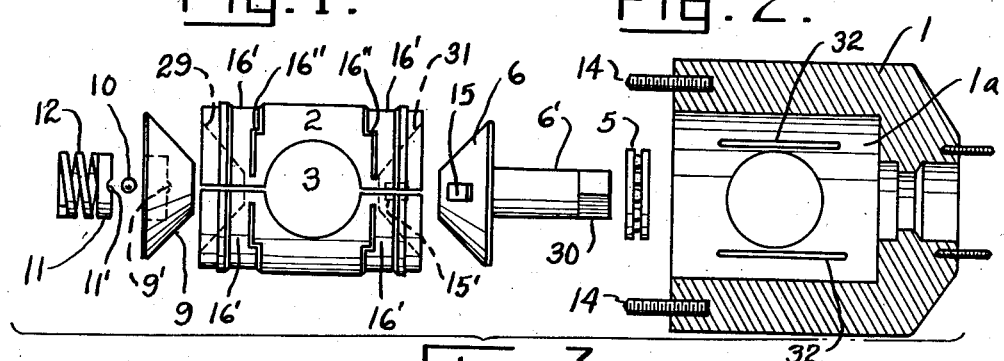
Figure 3 shows a plan view of the parts in unassembled relation showing the casing in horizontal section with the end cap and stuffing box removed and showing another form of lubricant grooves.

As shown in Figure 2 there are the external circumferentially disposed grooves 16', 16' in each of the valve sections. The intermediate portions 16'' of each of the grooves 16' are widened inwardly as clearly shown in Figure 3. As shown in Figure 3 the wall of the bore 1a is provided with longitudinal lubricant retaining grooves 32 which act as retainers for the lubricant. When the valve is turned to closed position the widened portions 16'' are connected with the ends of the grooves 32 so that the lubricant can flow from the grooves 16' into the grooves 32 to form seals all the way around the passageways 4.

Spaced above the bore 1a there is a cylindrical lubricant chamber 19 from which ducts 20 lead into the grooves 16, or 16'. The outer end of this chamber may be closed by the plug 23. This chamber is equipped with a conventional inlet valve 24 through which a lubricant may be forced into the space 25. A plunger 26 is fitted within the chamber and is seated against a coil spring 27. With the plug 23 removed a lubricant may be forced into the space 25, a sufficient quantity of lubricant being supplied to force the plunger 26 backwardly to place the spring 27 under compression and thereafter the pressure of the plunger against the lubricant in the space 25 will gradually feed the lubricant through the ducts 20 into the external grooves on the valve sections 2 whereby to lubricate the valve.

As shown in Figure 2 the valve sections have the longitudinal chambers 28 extending from end to end thereof. The material thus removed from the valve sections will allow said sections more flexibility so that the expanders 6, 9 will not only force the valve sections apart but will also be effective to expand them causing the assembled valve to form a close fit with the walls of the cylindrical bore 1a.

The drawing and description disclose what is now considered to be a preferred form of the invention by way of illustration only, while the broad principle of the invention will be defined by the appended claims.

What we claim is:

1. A valve mechanism comprising a valve casing having a fluid passageway therethrough and having a bore intersecting the passageway and forming a seat, a pair of semi-cylindrical valve sections, forming an approximately cylindrical expansible valve, fitted in the bore, said valve having outwardly flared recesses in the ends thereof, a stem extended through the casing, one flared expander being connected to the stem and seated in one of the flared recesses and operatively connected with the valve sections, a bearing interposed between the expander and the casing, another flared expander adapted to seat in the recess in the other end of the valve, an end cap closing said bore, a spring and a bearing interposed between the end cap and said other flared expander, the spring being effective to urge the sections outwardly in close sealing relationship with the walls of the bore, the valve having a flowway therethrough adapted to align with the passageway upon rotation of the valve in one direction and a seal between the valve stem and the casing.

2. A valve mechanism comprising a valve casing having a passageway therethrough and having a bore intersecting the passageway and forming a seat, an approximately cylindrical expansible valve in the bore formed of longitudinal sections, said valve having outwardly flared recesses in the ends thereof, a stem extending through the casing, a flared expander connected to the stem and seated in one of the flared recesses and operatively connected with the sections, a bearing interposed between the expander and the casing, a second flared expander adapted to seat in the second recess in the other end of the valve, an end cap closing said bore, a spring and a bearing interposed between the end cap and the second flared expander, the spring thereby urging the sections outwardly in close sealing relationship with the bore, said valve having a flowway therethrough adapted to align with the passageway upon suitable rotation of said valve, a packing forming a seal between the stem and the casing, said bore having lubricating grooves and a reservoir for a lubricant, yieldable means adapted to feed the lubricant from the reservoir into said grooves.

3. A valve assembly comprising a tubular valve casing having a longitudinal passageway for fluid therethrough and having a cylindrical bore approximately perpendicular to the passageway, a cylindrical valve having a transverse passageway therethrough positioned to be brought into and out of alignment with said fluid passageway, said valve being formed of longitudinal sections, one end of said bore being reduced and extended through the casing forming a bearing, a removable cap closing the other end of the bore and having an inside socket, said valve having flared recesses at its ends, a frusto-conical shaped expander fitted into one of said recesses and having an outer end socket, a ball bearing in said socket, a retainer plate fitted in the socket against the ball bearing, a coil spring located in the socket of said cap and bearing against said retainer plate, a frusto-conical shaped expander in the other end recess of the valve, operative connections between the valve and the last named expander, said last named expander having a stem fitted through the bearing in said casing and having its outer end accessible for turning said stem and valve.

WALTER L. CHURCH.
WILLIAM K. HOLLERON.